United States Patent
Roberts

[15] 3,645,401
[45] Feb. 29, 1972

[54] FILTER CHANGING DEVICE

[72] Inventor: John S. Roberts, Columbia, Md.

[73] Assignee: Concorde Fibers, Inc., Columbia, Md.

[22] Filed: Mar. 6, 1970

[21] Appl. No.: 17,283

[52] U.S. Cl. ............................................. 210/232, 210/432
[51] Int. Cl. ........................................................ B01d 29/02
[58] Field of Search ............................... 210/232–238, 328, 210/340, 341, 345, 391, 392, 420, 425, 426, 432, 446, 447

[56] References Cited

UNITED STATES PATENTS

| | | | |
|---|---|---|---|
| 169,988 | 11/1875 | Goodell | 210/340 X |
| 756,892 | 4/1904 | Quinn | 210/340 |
| 780,334 | 1/1909 | Freeman | 210/391 X |
| 3,059,276 | 10/1962 | Yokana | 210/340 X |
| 2,838,084 | 6/1958 | Samler | 210/98 X |

*Primary Examiner*—John Adee
*Attorney*—Nolte and Nolte

[57] ABSTRACT

A filter changing device comprising a rotatory structure having first and second passage means therethrough in nonparallel, nonintersecting relationship, each of the passage means being adapted releasably to hold a filter, and means for supporting the rotatory structure for rotation about an axis from a first position in which the respective ends of the first passage means are at predetermined points to a second position in which the respective ends of the second passage means instead of the first passage means are located at the same predetermined points.

4 Claims, 6 Drawing Figures

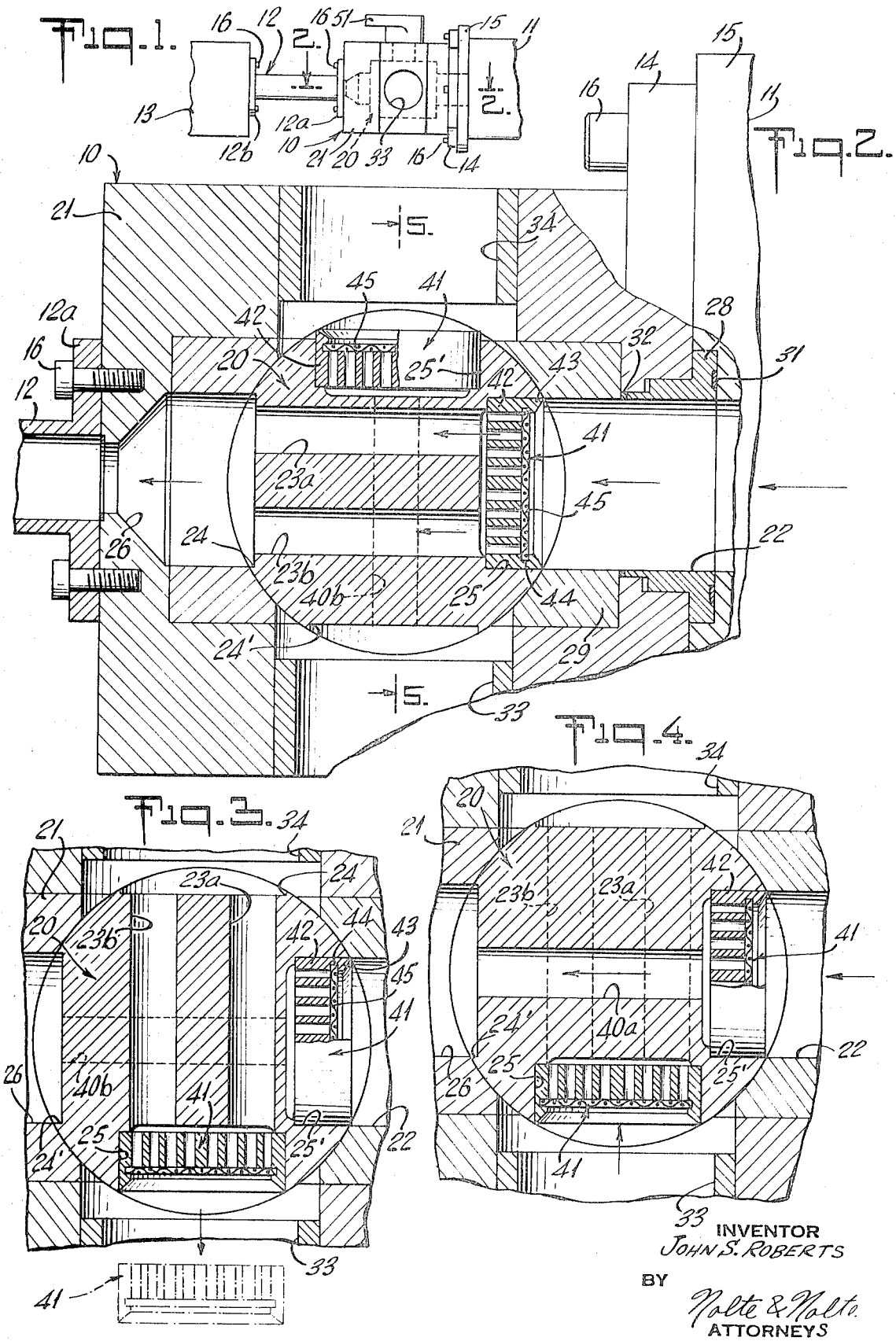

INVENTOR
John S. Roberts
BY
Nolte & Nolte
ATTORNEYS

FILTER CHANGING DEVICE

This invention relates to a filter changing device.

Extruders are employed to fabricate thermoplastics into shaped products, such as filaments, foils and the like. The solid thermoplastic is fed, generally in particulate form, particularly pellets, to the extruder in which it is compressed and heated to form a melt. The melt flows from the extruder to a die which does the shaping. Intermediate the extruder and the die in the flow path of the thermoplastic melt there generally is inserted a filter, the purpose of which is to strain any solid particles larger than a predetermined rather small size from the melt before the melt reaches the die. The filter generally consists of a foraminous plate supporting a number of layers of metallic screen, the latter effecting the actual filtering. To assure smooth operation of the apparatus, at relatively frequent intervals it is required that the filter be removed and replaced with a clean filter. In the absence of a device permitting changing of the filter while the extruder continues to operate, changing of the filter entails shutdown of the extruder and, hence, loss of production time.

According to the invention, there is provided an improved device for changing of the filter while the extruder continues to operate.

More particularly, according to the invention, there is provided a filter changing device comprising a rotatory structure having first and second passage means therethrough in nonparallel, nonintersecting relationship, each of the passage means being adapted releasably to hold a filter, and means for supporting the rotatory structure for rotation about an axis from a first position in which the respective ends of the first passage means are at predetermined points to a second position in which the respective ends of the second passage means instead of the first passage means are located at the same predetermined points. When the filter changing device is employed in conjunction with a fluid stream, as for example the flow of molten thermoplastic from an extruder to a die, the predetermined points are upstream and downstream, respectively, points of communication with the fluid stream.

In a preferred embodiment of the invention, the filter changing device comprises means defining a rotatory structure having passage means defined therethrough, means supporting the rotatory structure and permitting rotation thereof about a fixed axis, a first of the passage means having entry and exit ports axially aligned on a first line perpendicular to the axis, a second of the passage means having entry and exit ports axially aligned on a second line perpendicular to the axis. The second line lies in the same plane as the first line and is rotationally displaced about the axis from the first line. The first and second passage means do not intersect with each other. One of the ports of each of the first and second passage means is adapted releasably to hold a filter. The means for supporting the rotatory structure has an entry port and an exit port axially aligned on a line intersecting the aforementioned axis and lying in the aforementioned plane. The rotatory structure is thus adapted to be rotated in the supporting means about the aforementioned axis from a first position in which the ports of the first passage means communicate with the ports of the support means to a second position in which the ports of the second passage means communicate with the ports of the support means. When this device is inserted in a fluid stream, one of the ports of the support means receives the fluid and the fluid discharges from the device through the other port of the support means.

A preferred construction for providing the necessary communication between the ports of the rotatory structure and the ports of the support means while avoiding communication between the respective passage means is one in which the ports of each of the passage means are of greater diameter than a portion of the passage means intermediate the ports, the intermediate portion of the first of the passage means lying in planes perpendicular to the aforementioned axis completely outside planes perpendicular to said axis in which planes the second of the passage means lies. The preferred form of this construction is one in which the intermediate portion of each of the passage means comprises two passages the axes of which are equidistantly spaced from the axis of the respective passage means, i.e., the axis of the ports of the passage means. The two passages of one of the passage means may be spaced from each other in a direction parallel to the axis of rotation and the two passages of the other passage means may be spaced from each other in a direction perpendicular to the axis of rotation.

A preferred embodiment of the invention will now be described with reference to the drawings, in which:

FIG. 1 is a fragmentary side elevation of a filter changing device according to the invention in operating position between an extruder and a die;

FIG. 2 is a plan sectional view of FIG. 1 taken on section line 2—2 of FIG. 1;

FIG. 3 is a fragment of FIG. 2 with the filter carrying structure in a moved position;

FIG. 4 is the same fragment as in FIG. 3 with the filter carrying structure in the same position as in FIG. 3 but taken on section line 4—4 of FIG. 5;

Figure 5:
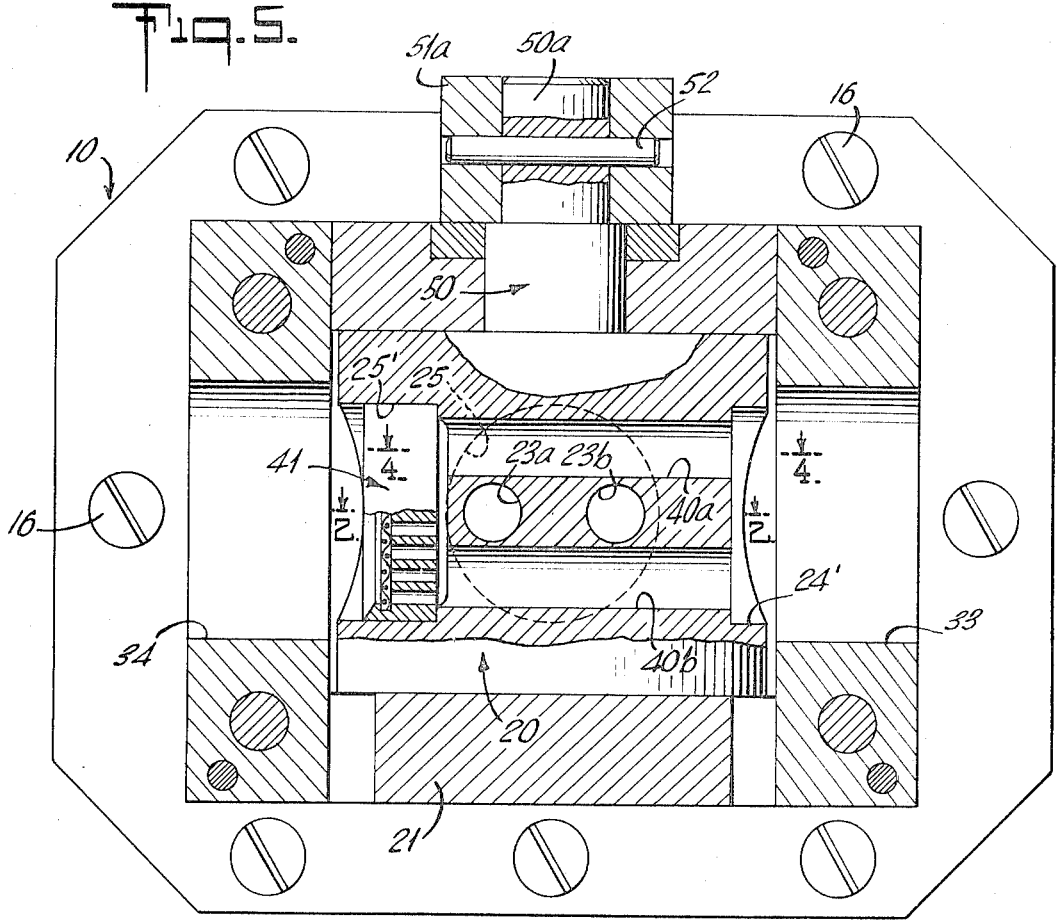
FIG. 5 is a section taken on section line 5—5 of FIG. 2.

As seen in FIG. 1, a filter-changing device 10 according to the invention is fastened to the discharge end of an extruder 11 to receive molten plastic therefrom and at its other side is fastened to a conduit 12 which receives the molten thermoplastic discharged from the device 10. The conduit 12 is fastened to an extrusion die assembly 13 with which it communicates. For the purpose of the fastening the device 10 is provided with a flange 14 and the extruder 11 is provided with a flange 15 and screws 16 passing through the flange 14 into flange 15 effect the fastening between device 10 and extruder 11. Likewise, the conduit 12 is provided at its ends with flanges 12a and 12b and screws 16 passing through these flanges fasten the conduit 12 to the device 10 and the die assembly 13, respectively.

The device 10 comprises a cylindrical rotatory structure 20 mounted in a supporting structure 21 with a fit permitting rotation of the cylindrical structure 20 about the axis of the cylinder (FIG. 2). The molten thermoplastic material flows in the direction indicated by the arrows in FIG. 2 into an entry port 22 provided in the supporting structure 21. Entry port 22 communicates with entry port 25 in the rotatory structure 20. Entry port 25 communicates with cylindrical passages 23a and 23b. Cylindrical passages 23a and 23b are equidistantly spaced from the axis of rotation, are of the same diameter and lie in a common axial plane perpendicular to the axis of rotation. At their other end, passages 23a and 23b communicate with an exit port 24 of the rotatory structure. Exit port 24 communicates with an exit port 26 in the supporting structure 21. The exit port 26 in turn communicates with the conduit 12.

As seen in FIG. 2, the entry port 22 is comprised of a stepped insert 28 having a cylindrical passage therethrough and abutting an insert seal 29 having a cylindrical passage therethrough. The insert 28 is received in a recess in the extruder housing and is fluidtightly sealed therewith by means of a sealing ring 31. Fluidtight sealing between the insert 28 and the insert seal 29 is provided by means of a sealing ring 32. At the other two sides of the device 10 ports 33 and 34 are provided in the supporting structure 21.

The rotatory cylinder 20 is provided with a second entry port 25' identical to entry port 25 but angularly displaced by 90° about the axis of rotation from the entry port 25. Likewise, the rotatory cylinder 20 is also provided with an exit port 24' identical to the exit port 24 but angularly displaced about the axis of rotation by 90° from the exit port 24. Communicating between entry port 25' and exit port 24' are cylindrical passages 40a and 40b. The passages 40a and 40b are of equal diameters, lie on axes which intersect the axis of rotation of the rotatory member 10 and are equidistantly spaced from the axis of the ports 24' and 25' (FIG. 5). As seen in FIG. 5, the passages 40a and 40b thereby do not communicate with the passages 23a and 23b.

The entry ports 25 and 25' are each so dimensioned as to receive with a sliding fit a filter 41 of conventional construction. Each filter 41 comprises a foraminous plate 42 provided with an annular lip 43 having an annular recess 44. In the annular recess 44 is received with a snap fit one or more metallic screens 45.

Figure 6:
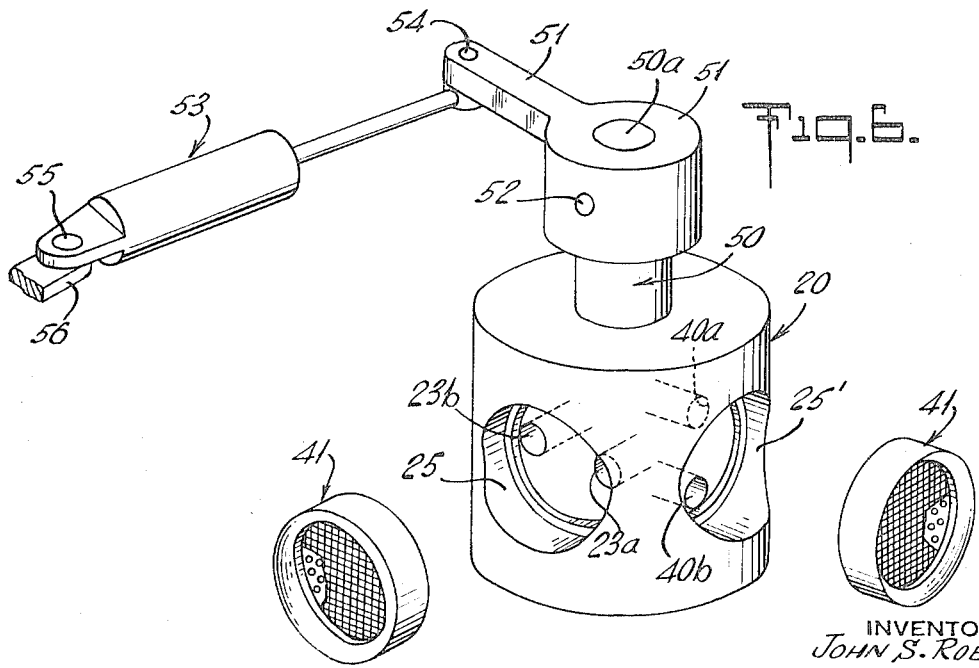
FIG. 6 is a perspective view of the device.

The rotatory structure can include an arbor 50 extending upwardly above the supporting structure 21 (FIGS. 5 and 6). The arbor 50 has an end portion 50a on which is fixed an arm 51 having a socket 51a. A pin 52 passing through an aperture in socket 51a and a corresponding aperture in the portion 50a of the arbor 50 fixes the arm 51 to the arbor 50. A fluid operated cylinder-piston-rod assembly 53 is pivotally connected at the free end of the rod to the free end of the arm 51 by means of a pivot pin 54 and the free end of the cylinder 53 is connected by means of a pivot pin 55 to fixed supporting structure 56.

Operation of the apparatus is as follows:

A filter 42 is inserted in each of entry ports 25 and 25'. Then the extrusion operation is begun with the molten thermoplastic flowing in the direction indicated by the arrows in FIG. 2. After a predetermined length of time when a quantity of filtered material has collected on the screen 45 such that efficient flow is no longer possible, the cylinder-piston-rod assembly 53 is actuated to rotate the rotatory structure 20 by 90° in the direction which would be clockwise as viewed in FIG. 2. This brings the rotatory structure into the position illustrated in FIGS. 3, 4 and 5 with the filter which was adjacent to the port 34 now in communication with the port 22 and the filter which was in communication with the port 22 now adjacent to the port 33. Thus, a clean filter has been placed into the fluid stream and the dirty filter has been removed therefrom. A rod (not illustrated) is then inserted through port 34 into passage 23a and 23b by hand and is brought to bear against the foraminous plate 42 of the dirty filter until the dirty filter is pushed out of the port 24' and through the port 33 as illustrated in phantom in FIG. 3 whereby the dirty filter is removed from the apparatus. Then, through the port 33 a clean filter may be inserted into the port 25. When the clean filter in port 25' has become so dirty as to require replacement, the rotatory structure 20 is rotated counterclockwise by 90° back to the position illustrated in FIG. 2 whereby the filter adjacent the port 34 is now the dirty filter and a clean filter has now been brought into communication with the port 22. At this time, the dirty filter may be removed from the port 25' by projecting a rod by hand through the port 33 into the passage 40a and 40b until the rod abuts against the foraminous plate of the filter and dislodges the filter from the port 25' into the port 34 where it may be removed from the apparatus by hand. A clean filter may then be inserted through port 34 to port 25'. This operation may be repeated over and over making possible filter changing whenever desired without interruption of the extrusion operation.

While the invention has been described in conjunction with thermoplastic extrusion, it will be appreciated that the invention is equally applicable to use in any fluid stream in which it is desired periodically to change a filter element with a shutdown.

What is claimed is:

1. A filter changing device comprising means defining a rotatory structure having passage means therethrough, means supporting said rotatory structure and permitting rotation of said rotatory structure about a fixed axis, a first of said passage means having entry and exit ports axially aligned on a first line perpendicular to said axis, a second of said passage means having entry and exit ports axially aligned on a second line perpendicular to said axis, said second line lying in the same plane as the first line and being rotationally displaced about said axis from said first line, said first and second passage means not intersecting with each other, one of the ports of each of said first and second passage means being adapted releasably to hold a filter, said means for supporting said rotatory structure having an entry port and an exit port axially aligned on a line intersecting said axis and lying in said plane, said rotatory structure thus being adapted to be rotated in said supporting means about said axis from a first position in which the ports of said first passage means communicate with the ports of the support means to a second position in which the ports of said second passage means communicate with the ports of the support means.

2. A filter changing device according to claim 1, in which the ports of each of said passage means are of greater diameter than a portion of the passage means intermediate the ports, the intermediate portion of the first of said passage means lying in planes perpendicular to said axis completely outside planes perpendicular to said axis in which planes the second of said passage means lies.

3. A filter changing device according to claim 2, in which the intermediate portion of each of said passage means comprises two passages the axes of which are equidistantly spaced from the axis of the respective passage means.

4. A filter changing device according to claim 2, in which the two passages of one of the passage means are spaced from each other in a direction parallel to the axis of rotation and the two passages of the other of the passage means are spaced from each other in a direction perpendicular to the axis of rotation.

* * * * *